June 11, 1963 V. B. DEAN 3,093,005
MEANS FOR JOINING FLEXIBLE BELTS
Filed Sept. 12, 1960

INVENTOR.
VAL B. DEAN
BY
McGrew and Edwards
ATTORNEYS

United States Patent Office 3,093,005
Patented June 11, 1963

3,093,005
MEANS FOR JOINING FLEXIBLE BELTS
Val B. Dean, Englewood, Colo., assignor to The Union Supply Company, Denver, Colo., a corporation of Colorado
Filed Sept. 12, 1960, Ser. No. 55,485
11 Claims. (Cl. 74—232)

This invention is directed to means for joining flexible belts, and more particularly, to arrangements for joining abutting ends of flexible conveyor belts to present a substantially contiguous load carrying surface.

It has been the practice of the prior art to join sections of conveyor belts by means such as metal staples, clips and the like. In some environments, such as flexible belts having a plurality of plies of vulcanized fabric and at least an upper layer of rubber-like material, the staples and clips are sometimes countersunk in the rubber-like layer.

However, as the development of such flexible belts has progressed, the load carrying surface, i.e., the upper flexible rubber-like material layer, has greatly increased in thickness. As this thickness has increased, longer staples and extended clip teeth have been used; and/or progressively deeper holes formed in the upper layer for countersinking such metal fastening devices.

These longer staples and clips with extended teeth have not proven entirely satisfactory due to abrasion by material being moved and because of the increased cost of manufacture, increased size including an increased clip and staple body for proper maintenance of the increased length of the penetrating portions thereof, and the like.

The countersinking concept has also not proven entirely satisfactory with increased thicknesses of conveyor belts because of the tendency of the material being conveyed to collect in the countersink depression. Furthermore, material such as hard rock metal ores carried on the belt, and particularly adjacent loading chutes and the like, have a tendency to roll and tumble and maintain a given position relative to such as the loading chute while the belt continues to move. When the foregoing occurs, there is extensive detrimental abrasion and wearing away of metal fastening devices when such are used.

Further, although the smooth rubber-like upper surface of the belts is relatively resistant of the above mentioned abrasion due to rolling and tumbling, when countersink holes come into contact with the rolling and tumbling material, the material collects against the trailing and leading edges of the holes and there is a destruction of the belt body thereadjacent.

My invention represents a departure from such prior art practices, overcomes the above noted shortcomings thereof, and teaches a new, successful and economical method of joining the abutting ends of flexible belts.

Briefly, my invention is comprised of forming an opening of predetermined configuration and dimensions in the upper surface of the conveyor belt. The ends or edges of the belts to be joined are each treated in the same manner to form a unitary clip receiving slot. In practice, a vertical plane passing parallel to and centrally between the ends of the abutting belts would define a pair of symmetrical depressions adjacent each other in the belts.

Novel cleat means are inserted in the above slots to thereby join the belts. The clip is comprised, essentially, of a rigid, preformed, preferably steel, base portion having spaced teeth of novel configuration, for engagement with intermediate plies of a belt. At least a pair of spaced, bolt receiving openings are adjacent the respective opposite ends of the longitudinal bisector of the steel base. A layer or pad of rubber-like material, similar to the material of the upper load carrying surface of the belt, is vulcanized in a novel manner to the upper surface of the base. The thickness of the pad material vulcanized to the steel plate is variable according to predetermined factors such as the thickness of the conveyor belt. A pair of spaced bolt receiving openings pass through the pad to register with the opening of the metal base.

The foregoing arrangement, when assembled with abutting ends or edges of flexible conveyor belts, serves to present a substantially contiguous load carrying surface devoid of metal portions with which a conveyed load may come in contact; and which presents an even surface devoid of depressions in which conveyed material may collect.

Further details of the construction of my novel joining devices and their use according to my arrangement for joining conveyor belts will be explained in detail hereafter.

It is thus among the objects of my invention to provide a novel arrangement of joining abutting ends of flexible belts and the like, which is economical, serves to increase the useful life of such conveyor belts; and which is adapted to be used to join varying thicknesses of such belts.

It is a further object of my invention to provide a novel cleat device for joining the abutting ends of flexible conveyor belts; which is inexpensive to manufacture, rugged, and presents no metal portions to loads being carried on the belt; which is inclusive of novel teeth for obtaining improved grip on such conveyor belts being joined; and in which its component elements are joined in a novel manner.

Further features and advantages inherent in the use of my arrangement and in use of my novel cleat devices will become obvious to those experienced in the art from a study of the hereafter set forth detailed description of the exemplary drawings, in which.

Before describing the drawings in detail, I wish it understood that they are merely exemplary of practices within my inventive concepts and I do not wish to be limited thereby; but rather that the spirit and scope of the invention be defined by the claims set forth hereafter.

Figure 1:
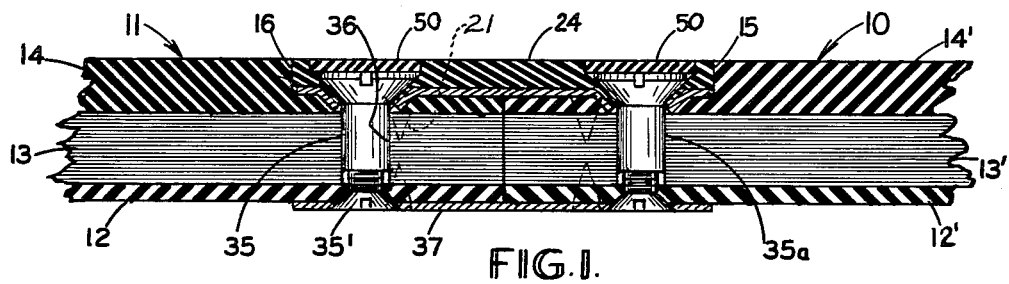
FIG. 1 is a side elevation, in partial section, of conveyor belts joined according to my teachings.

In the practice of my invention, edges of conveyor belts to be joined are cut to close fitting complementary configurations. These conveyor belts, such as belts 10 and 11 in FIG. 1, normally are comprised of a bottom layer 12 which is a relatively thin layer of a flexible rubber or rubber-like material; a center portion 13 normally comprised of a plurality of fabric layers vulcanized together; and a relatively thick top or load carrying layer 14, also of a rubber or rubber-like material. The said three layers 12, 13, and 14 are vulcanized to form a functionally unitary conveyor belt.

Figure 2:
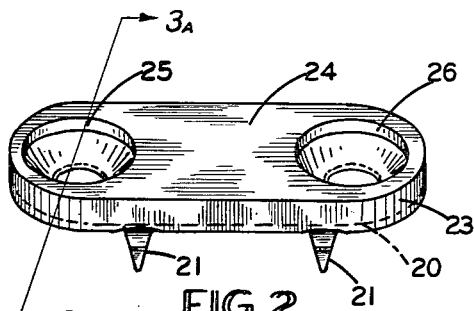
FIG. 2 is an enlarged isometric detail from the top of a novel cleat device according to my invention.
Figure 3:
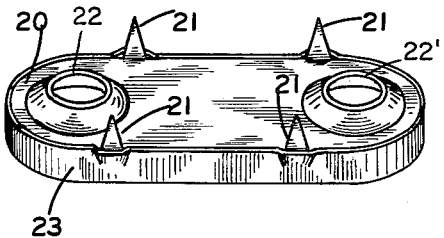
FIG. 3 is an enlarged isometric detail from the bottom of the device of FIG. 2.

In the practice of my invention, at least a pair of complementary and preferably symmetrical slots 15 and 16 are cut through the upper layer, such as layers 14 and 14', down to closely adjacent, but spaced from the intermediate multi-ply vulcanized fabric layers 13 and 13'. The slots 15 and 16 are of such dimension and configuration as to receive novel cleat device, shown in detail in FIGS. 2–4. The cleat device is comprised, essentially, of a relatively heavy gauge metal base portion 20 (FIGS. 2, 3 and 3a) having a plurality of spaced teeth 21 and at least a pair of spaced, recessed, bolt encompassing openings 22 and 22'. A relatively thick layer of rubber-like material 23 is vulcanized to the upper surface and over the periphery of the base 20 (FIG. 3a) and is of sufficient thickness that the upper surface 24 thereof will be flush with the upper surface of conveyor belts with which it is associated. A pair of spaced openings 25 and 26 pass through the upper layer 23 and are positioned to register with the openings 22 and 22' in the base portion 20.

Figure 3A:
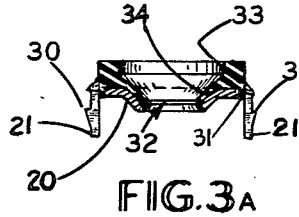
FIG. 3a is a section along line 3a—3a of FIG. 2.
Figure 4:
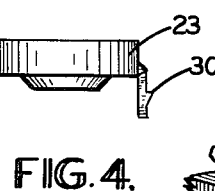
FIG. 4 is an end view of the device of FIG. 2.

Each of the plurality of teeth, such as tooth 21 in FIGS. 3a and 4, depends from a peripheral side or edge portion of the base 20 and curve through an angle of 90° relative to a horizontal plane through the base. Each of the teeth has a small raised bump or protuberance 30 which assists in maintaining a firm grip on the multiply fabric when inserted therein.

The rubber-like layer 23 (FIG. 3a) has an integral depending section 31 which extends down over a substantial area of the peripheral edges of the base portion. The foregoing prevents cutting contact between the rigid metal base portion and the body of the conveyor belt.

The bolt receiving openings 25 and 26 are countersunk below the upper surface 24. Each of these openings is characterized by a configuration having an upper generally tubular or cylindrical section 33 (FIG. 3a) extending for a short distance below the upper surface; an intermediate section therebelow generally in the form of a truncated cone 34; and a third section in the form of a passage 32 opening at one end to the apex of the cone 34 and at the other end to the passage 36.

Referring again to FIG. 1, a bolt such as bolts 35 and 35a passes through an opening 36 formed in the body of the belts in registration with the openings 22 and 22'. A rigid, preferably all metal, clip member 37 is placed on the bottom portion of the conveyor belts with openings symmetrical and in registration with such as the opening 36 to thereby receive and act as a bearing surface for the nut 35' on the lower end of the bolt 35.

Figure 6:
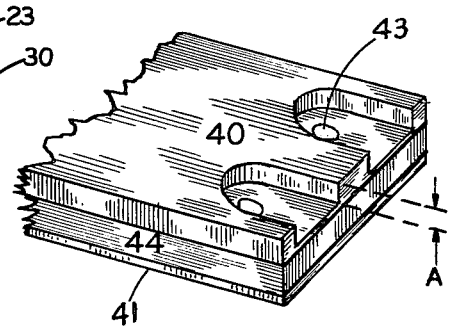
FIGS. 5–8 are illustrative of steps of joining conveyor belts according to my method.
Figure 5:
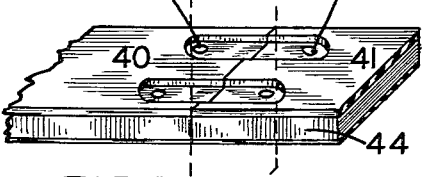

Reviewing the arrangement in which the foregoing cleat is used (FIG. 5), a plurality of slots (similar to the slots 15, 16 of FIG. 1) are formed adjacent and opening through the adjacent edges of a pair of conveyor belts such as 40 and 41 in FIG. 5. The depth of the slot is down to but spaced from the fabric ply section 44 and dictates the length and thickness of the cleat to be used. The depth is indicated by reference character A (FIG. 6). When the slots have been formed, a cleat such as discussed above is selected having a thickness equal to A from the bottom of the base portion 20 to the top surface 24. It is preferred that each of the slots be symmetrical about a vertical plane parallel to the ends of the conveyor belts, such as the plane P indicated in dotted lines in FIG. 5.

At least a pair of spaced openings 42 and 43 are drilled through the conveyor belts to register with the openings 22 and 22' of the cleat. Although only two such slots are shown in FIGS. 5 and 7, it is to be understood that any number may be formed across the bodies of the belts to be joined depending on their widths.

Figure 7:
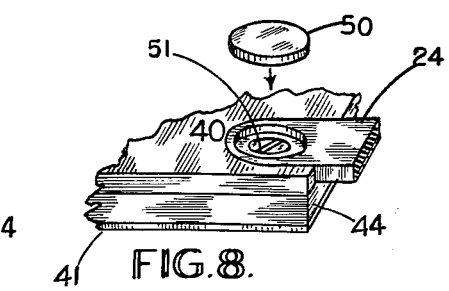
Figure 8:
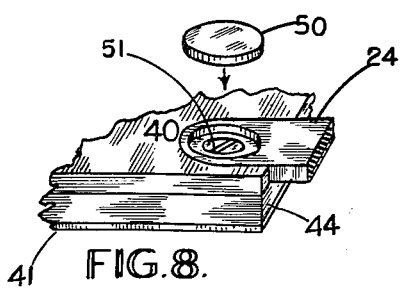

The cleat or cleats are then hammered or forced into the slots to a position flush with the surface of the belts (FIG. 7). Bolts are passed through the openings and countersunk below the cylindrical area 33 and bolted or secured at their respective opposite ends to bear against a bottom clip such as the clip 37 of FIG. 1. A plurality of small plugs 50 (FIG. 8) are then cemented or fixed in a like manner into the cylindrical portion 33 above the bolt head 51, thereby presenting a substantially contiguous load carrying surface in which no metal portion of any cleat comes in contact with material being conveyed.

Of course, it is to be understood that the plugs 50 will not be necessary in all environments, such as where the upper surfaces of the bolt heads are substantially flush with the load carrying surface and/or the material being carried thereon will not be deleterious to the bolt heads. Also, the bolts and plugs can be vulcanized with the rest of the cleat to form a functionally unitary device.

Furthermore, although it is to be understood that I prefer the slots formed in the upper surfaces of the conveyor belts to be substantially symmetrical about a plane parallel to and centrally located between their respective ends, in other environments, such as where two different thicknesses of belts are being joined, such may be varied. For example, the thicker of the two belts would have a longer slot while the lighter of the two belts would have a lesser length of slot. The foregoing assures an even distribution of retaining power across the cleats.

Having described by invention in sufficient detail to enable those skilled in the art to understand and practice it, what I desire to protect by Letters Patent is defined in the following claims.

What is claimed is:

1. As an article of manufacture, a cleat device adapted to be mounted in groups and countersunk in aligned slots formed in the upper surface of abutting edge portions of a flexible belt and secured to said portions so as to form a smooth and substantially unobstructed conveying surface above said abutting edge portions comprising, a relatively long, rigid base portion having at least a pair of spaced bolt receiving openings, a plurality of teeth spaced around the periphery and depending from said base substantially normal to its bottom side, a rubber-like second portion fixedly secured to the top surface of said base portion and having an integral peripheral extension section depending therefrom in covering relation to a substantial area of the peripheral edges of said base portion, and there being openings through said second portion in registrable bolt-receiving relation with the said bolt-receiving openings of said base portion.

2. As an article of manufacture, a cleat device adapted to be mounted in groups and countersunk in aligned slots formed in the upper surface of abutting edge portions of a flexible belt and secured to said portions so as to form a smooth and substantially unobstructed conveying surface above said abutting edge portions comprising, a relatively long, rigid metal base portion having at least a pair of longitudinally spaced bolt receiving openings, a plurality of teeth spaced around the periphery and depending from the edges of said base and curving substantially normal thereto, a rubber-like portion of substantial thickness relative to the base vulcanized to the top surface thereof and having an integral peripheral extension section depending therefrom in covering relation to a substantial area of the peripheral edges of said base portion, and there being openings through said second portion in registrable bolt-receiving relation with the bolt-receiving openings of said base portion.

3. The article of claim 2 in which the teeth have side protuberances for gripping relation with belts when in use.

4. As an article of manufacture, a cleat device adapted to be mounted in groups and countersunk in aligned slots formed in the upper surface of abutting edge portions of a flexible conveyor belt and secured to said portions so as to form a smooth and substantially unobstructed conveying surface above said butting edge portions comprising, a relatively long, rigid base portion having at least a pair of spaced bolt receiving openings, a plurality of teeth spaced around the periphery and depending from the edges of opposite sides of said base portion substantially normal to its bottom, a second portion fixedly secured to the top surface of said base portion and having an integral peripheral extension depending therefrom in covering relation to a portion of the area of the peripheral edges of said base portion, there being openings in said second portion in registering relation with said openings in said base portion, said openings through said second portion being characterized by an upper generally tubular section, a downwardly tapering intermediate section, and a tubular passage section opening from the bottom of said intermediate section at one end and in registry with the openings of said base portion at the other end.

5. As an article of manufacture, a cleat device adapted to be mounted in groups and countersunk in aligned slots formed in the upper surface of abutting edge portions of a flexible conveyor belt and secured to said portions so as to form a smooth and substantially unobstructed conveying surface above said abutting edge portions comprising, a relatively long and rigid metal base portion having at least a pair of longitudinally spaced bolt receiving openings, a plurality of teeth spaced around the periphery and depending from the edges of said base portion substantially normal to its bottom, a rubber-like portion of substantial thickness relative to the base portion vulcanized to the top surface of said base portion and having integral peripheral extension sections depending therefrom in covering relation to a substantial area of the peripheral edges of said base portion, there being openings in said rubber-like portion in registering relation with the openings in said base portion, said openings through said rubber-like portion being characterized by an upper generally tubular section, an intermediate generally truncated conical section therebelow and a tubular section depending from the apex of said conical portion at one end and in registry with the openings of said base portion at the other end, said upper tubular section adapted to receive complementary sealing plug portions in covering relation to bolt heads when in use.

6. As an article of manufacture, a cleat device adapted to be mounted in groups and countersunk in aligned slots formed in the upper surface of abutting edge portions of a flexible conveyor belt and secured to said portions so as to form a smooth and substantially unobstructed conveying surface above said abutting edge portions comprising, an elongated relatively rigid metal base having at least a pair of longitudinally spaced bolt holes, a plurality of teeth spaced around the periphery and depending from opposite sides of said base substantially normal to its bottom, a rubber-like pad vulcanized to the top surface of said base and having an integral peripheral extension depending therefrom in covering relation to a major surface area of the peripheral edges of said base, said rubber-like pad having bolt openings therethrough, said bolt openings in said pad being characterized by a truncated conical portion and a cylindrical portion depending from said conical portion in registry with the bolt holes of said base.

7. The combination with abutting end portions of a conveyor belt comprising layers of fabric disposed between upper and lower layers of rubber-like material vulcanized to form a unitary structural assembly, a plurality of lengthwise extending slots in the upper layer of each end portion arranged in alignment with the corresponding slots of the other said end portion, a cleat member fitted in each of said aligned slots comprising a metallic base portion, an upper rubber-like portion, and depending teeth on said bottom portion in gripping relation to material of the belt, said upper portion being constructed and arranged to fill the slotted area with its exposed surface aligned with the top of the belt, and a bolt extending from the lower surface of each belt section through the cleat with its top surface below the exposed surface of said upper cleat portion.

8. The combination with abutting end portions of a conveyor belt comprising, layers of fabric disposed between upper and lower layers of rubber-like material vulcanized to form a unitary structural assembly, a plurality of lengthwise extending slots in the upper layer of each end portion arranged in alignment with the corresponding slots of the other said end portion, a cleat member fitted in each of said aligned slots comprising a metallic base portion, an upper rubber-like portion, and depending teeth on said bottom portion in gripping relation to fabric layers of the belt, said upper portion being constructed and arranged to fill the slotted area with its exposed surface aligned with the top of the belt, a bottom clip, and a bolt extending from the lower surface of the bottom clip through the cleat with its top surface below the exposed surface of said upper cleat portion.

9. The combination with abutting end portions of a conveyor belt comprising, layers of fabric disposed between upper and lower layers of rubber-like material vulcanized to form a unitary structural assembly, a plurality of lengthwise extending slots in the upper layer of each end portion arranged in alignment with the corresponding slots of the other said end portion, a cleat member fitted in each of said aligned slots comprising a metallic base portion, an upper rubber-like portion, and depending teeth on said bottom portion in gripping relation to fabric layers of the belt, there being at least a pair of spaced bolt-receiving passages through said cleat each characterized by a tubular countersink depression at the top of greater dimension than the remainder of said passage, said upper portion being constructed and arranged to fill the slotted area with its exposed surface aligned with the top of the belt, a bottom clip, and a bolt extending from the lower surface of the bottom clip through each cleat passage with its top surface below the exposed surface of said upper clear portion in said countersink depression.

10. The combination with abutting end portions of a conveyor belt comprising, layers of fabric disposed between upper and lower layers of rubber-like material vulcanized to form a unitary structural assembly, a plurality of lengthwise extending slots in the upper layer of each end portion arranged in alignment with the corresponding slots of the other said end portion, a cleat member fitted in each of said aligned slots comprising a metallic base portion, an upper rubber-like portion, and depending teeth on said bottom portion in gripping relation to the material of the belt, there being at least a pair of spaced bolt-receiving passages through said cleat, each characterized by a tubular countersink depression at the top of greater dimension than the remainder of said passage, said upper portion being constructed and arranged to fill the slotted area with its exposed surface aligned with the top of the belt, a bottom clip, and a bolt extending from the lower surface of said bottom clip through each cleat passage with its top surface below the exposed surface of said upper cleat portion in said countersink depression, and plug means for insertion in said depressions above said bolt top surface flush with the top of the belt.

11. The combination with abutting end portions of a flexible conveyor belt having a flexible rubber-like upper conveying surface, a plurality of lengthwise extending slots disposed in the rubber-like layer of each end portion of the belt and arranged in alignment with corresponding slots of the abutting end portion, a cleat member fitted in each of said aligned slots comprising an elongated, rigid metal base portion, an upper rubber-like portion, depending teeth on said cleat disposed in gripping relation to the material of the belt, said upper portion being constructed and arranged to fill the slotted area with its exposed surface aligned with the top of the rubber-like layer of the belt, and a bolt extending from the lower surface of each belt section through the cleat with its top surface below the exposed rubber-like upper surface of said upper cleat portion.

References Cited in the file of this patent

UNITED STATES PATENTS

| | | |
|---|---|---|
| 1,659,001 | Purple | Feb. 14, 1928 |
| 2,446,311 | Traxler | Aug. 3, 1948 |
| 2,516,779 | Lesesne | July 25, 1950 |
| 2,667,789 | Ludwig et al. | Feb. 2, 1954 |

FOREIGN PATENTS

| | | |
|---|---|---|
| 684,396 | Great Britain | Dec. 17, 1952 |